(12) United States Patent
Mohanaveeramani et al.

(10) Patent No.: US 10,193,466 B2
(45) Date of Patent: Jan. 29, 2019

(54) METHOD AND DEVICE FOR DAMPING VOLTAGE HARMONICS IN A MULTILEVEL POWER CONVERTER

(71) Applicant: ABB SCHWEIZ AG, Baden (CH)

(72) Inventors: Aravind Mohanaveeramani, Chennai (IN); Jean-Philippe Hasler, Västerås (SE); Suman Maiti, West Bengal (IN)

(73) Assignee: ABB SCHWEIZ AG, Baden (CH)

(*) Notice: Subject to any disclaimer, the term of this patent is extended or adjusted under 35 U.S.C. 154(b) by 20 days.

(21) Appl. No.: 15/573,046

(22) PCT Filed: May 18, 2015

(86) PCT No.: PCT/EP2015/060873
§ 371 (c)(1),
(2) Date: Nov. 9, 2017

(87) PCT Pub. No.: WO2016/184491
PCT Pub. Date: Nov. 24, 2016

(65) Prior Publication Data
US 2018/0123444 A1    May 3, 2018

(51) Int. Cl.
*H02M 5/29* (2006.01)
*H02M 5/293* (2006.01)
(Continued)

(52) U.S. Cl.
CPC ............... *H02M 5/293* (2013.01); *H02J 1/02* (2013.01); *H02J 3/1857* (2013.01); *H02M 1/12* (2013.01);
(Continued)

(58) Field of Classification Search
CPC ........... H02J 1/02; H02M 7/7575; H02M 1/12
See application file for complete search history.

(56) References Cited

U.S. PATENT DOCUMENTS 8,766,570 B2 * 7/2014 Geyer ..................... H02M 1/12
318/254.1
2012/0161685 A1    6/2012 Geyer et al.
(Continued)

FOREIGN PATENT DOCUMENTS

EP          2469692 A1    6/2012
EP          2546979 A1    1/2013
(Continued)

OTHER PUBLICATIONS

C. D. Townsend, R. A. Baraciarte, D. Tormo, H. Z. De La Parra, G. D. Demetriades and V. G. Agelidis, "Heuristic model predictive modulation in high power multi-level converters," IECON 2015—41st Annual Conference of the IEEE Industrial Electronics Society, Yokohama, 2015, pp. 000392-000397.*
(Continued)

*Primary Examiner* — Gary L Laxton
*Assistant Examiner* — Peter Novak
(74) *Attorney, Agent, or Firm* — Birch, Stewart, Kolasch & Birch, LLP (57) ABSTRACT

A method for controlling a modular multilevel converter to reduce the lower order harmonics generated by the converter is provided. The method may also reduce the overall switching loss of the converter by switching the switches close to fundamental switching frequencies while still reducing the lower order harmonics that are generated.

20 Claims, 6 Drawing Sheets

(51) Int. Cl.
  *H02J 1/02*   (2006.01)
  *H02M 1/12*   (2006.01)
  *H02J 3/18*   (2006.01)
  *H02M 7/483*   (2007.01)
(52) U.S. Cl.
  CPC .... *H02M 7/483* (2013.01); *H02M 2005/2932* (2013.01); *Y02E 40/26* (2013.01)

(56) References Cited

U.S. PATENT DOCUMENTS

| | | | | |
|---|---|---|---|---|
| 2013/0015704 | A1* | 1/2013 | Tsai | H02J 9/062 307/23 |
| 2017/0085193 | A1* | 3/2017 | Akagi | H02M 1/42 |

FOREIGN PATENT DOCUMENTS

| | | |
|---|---|---|
| IN | 40/2013 | 10/2013 |
| JP | 58-212371 A | 12/1983 |

OTHER PUBLICATIONS

International Preliminaiy Report on Patentability, issued in PCT/EP2015/060873, dated Sep. 14, 2017.

International Search Report, issued in PCT/EP2015/060873, dated Jan. 15, 2016.

Ray et al., "Harmonics elimination in a multilevel inverter using the particle swarm optimisation technique", IET Power Electron, 2009, vol. 2, No. 6, pp. 646-652.

Rodriguez et al., "Multilevel Converters: An Enabling Technology for High-Power Applications", Proceedings of the IEEE, Nov. 2009, vol. 97. No. 11, pp. 1786-1817.

Wang et al., "A Practical Harmonics Elimination Method for Multilevel Inverters", Conference Record of the 2005 IEEE Industry Applications Conference Fortieth IAS Annual Meeting, Oct. 2-6, 2005, vol. 3, pp. 1665-1670.

Written Opinion of the International Preliminary Examining Authority, issued in PCT/EP2015/060873, dated Apr. 18, 2017.

Written Opinion of the International Searching Authority, issued in PCT/EP2015/060873, dated Jan. 15, 2016.

Xue et al., "Optimal Programmed Staircase Waveforms for Cascaded Multilevel Inverter", 2012 IEEE 7th International Power Electronics and Motion Control Conference—ECCE Asia, Jun. 2-5, 2012, Harbin, China, pp. 2T74-2778.

Korondi et al., "Improving Harmonics of a Current Controlled Parallel Resonant Dual Converter," 20th International Conference on Industrial Electronics, Control and Instrumentation, Sep. 5-9, 1994, pp. 322-327.

\* cited by examiner

METHOD AND DEVICE FOR DAMPING VOLTAGE HARMONICS IN A MULTILEVEL POWER CONVERTER

TECHNICAL FIELD

The present disclosure relates to a method and devices for modulating a power converter for reducing lower order harmonics.

BACKGROUND

A delta connected multilevel converter, e.g. a static synchronous compensator (STATCOM) comprises, for each phase leg, an alternating current (AC) side and a direct current (DC) side. The DC bus voltage of the DC side for any phase leg is the sum of the cell capacitor voltages on that particular phase leg. This DC bus voltage is a fictive bus which does not appear structurally in the converter. The STATCOM contains three legs, each leg between two phases. When measuring the fictive DC bus voltage of the leg between the phases A and B, then all the cell capacitor voltages in that particular leg are added together and that is called the DC bus voltage of the phase leg AB. Similarly, in case of a Y (called wye or star) connected STATCOM, the DC bus voltage is between phase (A, B or C) and neutral (called N or earth). The AC harmonic generation by a multilevel converter depends on the number of cells and switching frequency per cell. For cell switching frequencies above three times the fundamental frequency (which may be e.g. 50 or 60 Hz), the lower order voltage harmonics (typically $3^{rd}$, $5^{th}$, $7^{th}$, $9^{th}$ and $11^{th}$) generated by the converter phase leg is insignificant for multilevel converters with a large number of cells, e.g. above 20, according to the Pulse-width modulation (PWM) theory. This holds true when the cell voltages are fixed (i.e. converter is in no-load). However, when the converter is loaded, even harmonics appear on the DC side of the cell voltages which can be seen through power balance between the AC and DC sides. These even harmonic voltages on the DC side interact with the fundamental modulating reference voltage to generate stray magnitudes (up to 2%) of lower order voltage harmonics on the AC side of the converter. Also, in addition to this, when a lesser pulse number per cell (less than 3.5) is used, then the triangle comparison based modulation scheme will generate lower order harmonics irrespective of the number of cells used (i.e., could be more than 20 cells). This phenomenon could be referred to as lower order voltage harmonics generated due to the modulation scheme.

Though the current controller can correct these low order harmonics, the extent of correction is limited by the bandwidth of the current controller. Hence, there would be specific filter requirements for these harmonics to bring the voltage distortion under customer requirements which in turn would increase the cost of the overall system.

In phase shifted carrier (PSC) based PWM, cell capacitor voltages are balanced by adding or subtracting an in-phase component of the current with the voltage reference. A conventional voltage based sorting algorithm can also be used for balancing of cell capacitor voltages. The converter with PSC based PWM generates lower order harmonics, e.g. $3^{rd}$ and $5^{th}$ order harmonics. Fast Fourier transform (FFT) is performed on the voltage measured across the valves of the converter phase leg excluding the drop across the arm reactor. As mentioned above, it has also been observed that the magnitude of the lower order harmonics is further increased with the reduction of pulse number.

The lower order harmonics generated on the AC side of the converter may be due to the following reasons:

(i) Ripple in the cell capacitor voltages due to the instantaneous power flowing through the cell capacitors.

(ii) Improper volt-second balance due to non-idealities, e.g. variation of reference voltage within the time period of carrier signal (i.e., due to low pulse numbers) and variation of cell capacitor voltages.

The second point becomes more prominent when the converter is subjected to operate at low pulse number, e.g. around a pulse number of 3 or less. U.S. Pat. No. 8,766,570 discloses a control method for a converter. Switching sequences are calculated either through model predictive direct torque control (MPDTC) or offline calculated optimized pulse patters (OPP) to optimize a certain control function such as switching loss, reduced total harmonic distortion (THD), etc. These switching patterns are calculated for steady state operation. When the switching function is applied in real time, due to the non-linearity in the system and due to transient operation of the converter, the actual flux generated by the converter deviates from the desired flux. Hence a prediction model is used to predict the flux error in the switching horizon, when using the switching sequence. At least one transition time of the switching sequence is changed in an attempt to minimize the predicted flux error. The flux error minimization control method is performed on a three-phase level and its target is to reduce the current THD.

SUMMARY

It is an objective of the present invention to provide an improved control of a multilevel converter in which lower order harmonics on the AC side are dampened.

There are several possible ways to damp these lower order harmonics through control. For instance, an expression based method may be used to reduce lower order harmonics. According to such a method, an expression for the $n^{th}$ order voltage harmonic is derived based on Double Fourier Transform. The reference voltage is modified with this expression, such that the $n^{th}$ order harmonic does not present in the converter voltage. But, due to the complexity of the Double Fourier Transforms, only a simplified expression for the lower order harmonics due to the baseband components may be possible. Hence, the error due to the expression increases as the pulse number is reduced. This is due to the fact that the dominance of the baseband harmonics contributing to lower order harmonics reduces, as compared to the carrier and sideband harmonics, during a low pulse number operation.

Another way may be the use of a mathematical model of the converter (converter topology and modulation function) as an estimator, to predict at least one future state of the harmonic voltage that will be generated by the converter. A low pass filter may then be used on the estimated harmonic voltage to extract the lower order components. This estimated lower order harmonic may be used as a feed forward in the control loop to damp them. The efficiency of damping is proportional to the rate at which the estimator is operated. Also, the amount of programming efforts needed by the estimator may be large. The PSC itself may generate high ($\approx$1-2%) lower order harmonics at low pulse number (PN less than 3.5) which may be reduced by a factor of 5-8 with the estimator based damping.

If the converter is generating lower order harmonics e.g. $3^{rd}$, $5^{th}$, $7^{th}$, etc., passive filters may be installed to inhibit those lower order harmonics to flow into the grid. However, a problem is then that the background harmonic voltages (if present in the grid) may create resonance with the existing passive filters. This problem can be avoided, if the converter generated lower order harmonics are reduced. The proposed modulation algorithm of the present invention tries to achieve this with very low pulse numbers (around 2, which corresponds to a (fundamental) device switching frequency of 50 Hz). Hence, the switching losses generated by the converter are reduced.

According to the present invention, a new pulse width modulation (PWM) technique is presented which predicts the switching instant (insert/bypass of a cell) such that the flux error becomes zero at the end of each half switching sample duration ($T_{sw}/2$). Here, the term half switching duration corresponds to half the time period of effective converter switching time period which is represented by Equation 1.

$$\frac{T_{sw}}{2} = \frac{1}{2 * PN * NL * f_s} \qquad \text{Equation 1}$$

Where, $T_{sw}$ is the switching duration of the effective carrier seen on the converter level, PN is the pulse number per cell in the multi-level converter, NL is the number of cells per phase leg, and $F_s$ is the fundamental frequency of the voltage reference.

The new PWM method reduces the lower order harmonics generated by the converter. The method predicts the instant of switching (insert/bypass of a cell) such that the flux error reaches as close to zero as possible at the end of each half switching duration. It is seen that the magnitude of the lower order harmonics (up to $30^{th}$ harmonics) is reduced below 0.2% at an average pulse number of 2.4 (close to fundamental switching frequency) for a converter with 20 cells per arm.

An aim is to reduce the lower order harmonics at low pulse number without using any harmonic damper.

According to an aspect of the present invention, a method for reducing lower order harmonics of a multi-level power converter comprising at least one phase leg comprising a plurality of chain-link connected cells each comprising a capacitor is provided. The method comprises, for each phase leg of the converter: obtaining a present reference voltage for use during a present half switching duration ($T_{sw}/2$); dividing the half switching duration into a plurality of time samples; and at the beginning of each time sample: predicting the reference voltage waveform for the remainder of the half switching duration based on the obtained present reference voltage; predicting the leg output voltage waveform for the remainder of the present half switching duration for the case that no cell is inserted or bypassed in the leg during the time sample, and for the case that one cell is inserted or bypassed in the leg during the time sample; predicting the flux error at the end of the present half switching duration for each of the cases, based on the obtained present reference voltage, the predicted reference voltage waveform and the predicted leg output voltage waveforms; and determining whether to insert or bypass the cell, during the time sample, based on the predicted flux errors.

According to another aspect of the present invention, there is provided a computer program product comprising computer-executable components for causing a control unit for a phase leg of a power converter to perform an embodiment of the method of the present disclosure when the computer-executable components are run on processor circuitry comprised in the control unit is provided.

According to another aspect of the present invention, a control unit for a phase leg of a multi-level power converter is provided. The control unit comprises processor circuitry, and a storage unit storing instructions executable by said processor circuitry whereby said control unit is operative to: obtain, from a current control, a present reference voltage for use during a present half switching duration; divide the half switching duration into a plurality of time samples; and at the beginning of each time sample: predict the reference voltage waveform for the remainder of the half switching duration based on the obtained present (and possibly any previous) reference voltage; predict the leg output voltage waveform for the remainder of the present half switching duration for the case that no cell is inserted or bypassed in the leg during the time sample, and for the case that one cell is inserted or bypassed in the leg during the time sample; predict the flux error at the end of the present half switching duration for each of the cases, based on the obtained present reference voltage, the predicted reference voltage waveform and the predicted leg output voltage waveforms; and determine whether to insert or bypass the cell, during the time sample, based on the predicted flux errors.

According to another aspect of the present invention, a power converter comprising a plurality of phase legs is provided, with each of which comprises an embodiment of the control unit of the present disclosure.

According to another aspect of the present invention, a computer program for reducing lower order harmonics of a multi-level power converter is provided. The computer program comprises computer program code which is able to, when run on processor circuitry of a control unit for a phase leg of the power converter, cause the control unit (10) to: obtain, from a current control, a present reference voltage for use during a present half switching duration; divide the half switching duration into a plurality of time samples; and at the beginning of each time sample: predict the reference voltage waveform for the remainder of the half switching duration based on the obtained present reference voltage; predict the leg output voltage waveform for the remainder of the present half switching duration for the case that no cell is inserted or bypassed in the leg during the time sample, and for the case that one cell is inserted or bypassed in the leg during the time sample; predict the flux error at the end of the present half switching duration for each of the cases, based on the obtained present reference voltage, the predicted reference voltage waveform and the predicted leg output voltage waveforms; and determine whether to insert or bypass the cell, during the time sample, based on the predicted flux errors.

According to another aspect of the present invention, there is provided a computer program product comprising an embodiment of a computer program of the present disclosure and a computer readable means on which the computer program is stored are provided.

The present disclosure relates to a method for controlling a modular multilevel converter to reduce the lower order harmonics generated by the converter. The method may also reduce the overall switching loss of the converter by switching the switches (semiconductor devices) close to fundamental switching frequencies while still reducing the lower order harmonics generated.

The method uses mathematical equations to compute the desired flux (volt-seconds) that should be generated by the converter every half switching duration. The switching instant to achieve the desired flux is computed through mathematical equations and operating condition of the converter (cell voltages, current, cell capacitances etc.). This facilitates reaching zero (or close to zero) flux error at the end of every half switching duration.

Also, additional switching may be allowed within a half switching duration, e.g. if the predicted flux error at the end of the half switching duration, as calculated predictively for every sample is outside a predetermined range. Thus, this method may allow one or a few additional switchings to achieve reduced lower order harmonics, which would not be possible with traditional carrier based PWM methods. Also, it may be possible to operate the converter at fundamental device switching frequencies when the converter has large number of cells, thereby reducing the losses of the converter.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
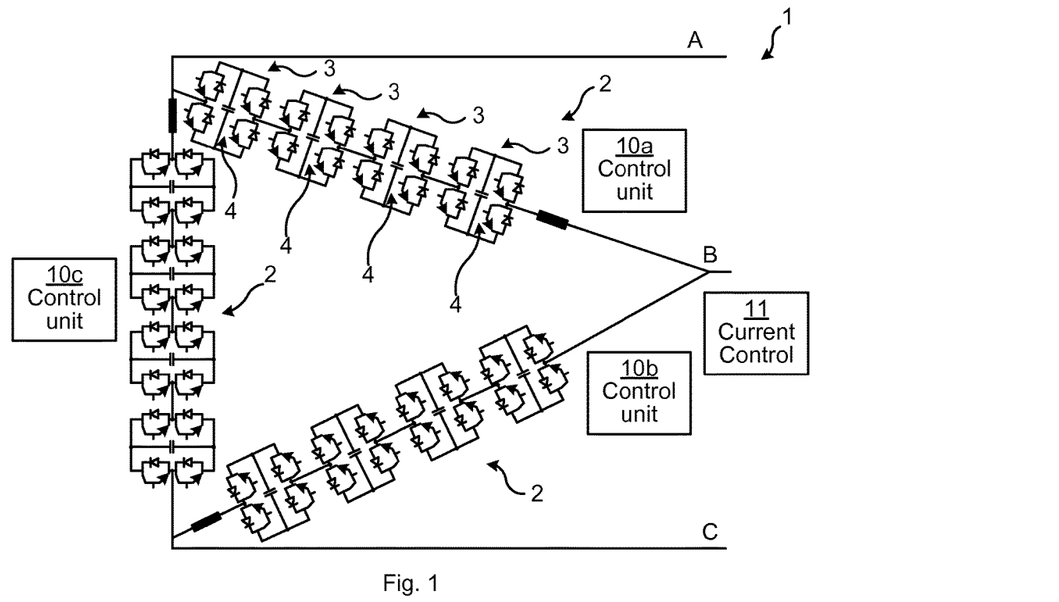
FIG. 1 is a schematic circuit diagram of an embodiment of an AC-AC converter in delta configuration, in accordance with the present invention.

A delta connected chain-link based STATCOM, as shown in FIG. 1 as an example of a power converter in accordance with the present invention, is a voltage source converter (VSC) which can behave like an inductor or capacitor, storing the reactive power in its cell capacitors. This causes lower order harmonics on the AC side of the converter. Also, in addition to this when a lesser pulse number per cell (less than 3.5) is used, then the triangle comparison based modulation scheme may generate lower order harmonics irrespective of the number of cells used (e.g., could be more than 20 cells). As an alternative to a STATCOM, the multilevel converter of the present invention may be a static VAR compensator (SVC). The same discussion is valid also for Y-connected converters.

Herein, the time integral of voltage is defined as flux. The time integral of a difference between actual voltage generated by the converter and the reference voltage is defined as the flux error.

FIG. 1 schematically illustrates an embodiment of a chain-link converter 1 of the present invention. In the embodiment of FIG. 1, the chain-link converter 1 is in a delta configuration and in a full-bridge configuration. The converter 1 is configured to control and be connected to a three-phase AC system having the phases A, B and C. The converter 1 comprises three phase legs 2, each connected between two of the phases A, B and C. Each of the phase legs 2 comprises a plurality of series-connected converter cells 3. Each cell 3 comprises a capacitor 4. A current control 11 is comprised in the converter 1 in order to control the operation of each of the phase legs 2 of the converter 1, e.g. by setting reference voltages for the phase legs 2. In accordance with embodiments of the present invention, the converter 1 also comprises a control unit 10 for each phase, here called 10a, 10b and 10c depending on the phase leg 2 it is configured to control. The control units 10 thus perform control on a lower (per phase) level in the converter than the current control 11. Each control unit 10 comprises a processor and a data storage unit, as well as other circuitry which may be appropriate. In accordance with the present invention, the control unit 10 implements a plurality of control functions on its phase leg 2 of the converter 1 for improving the operation of the converter 1 in accordance with the present invention. One or more of the control units 10 may be co-located with each other and/or with the current control 11, and may thus share components e.g. processor circuitry and/or data storage with each other.

The method of the present invention may be a PWM method which performs switching in such a way that the flux error reaches to zero at each half switching duration. A switching duration (sometimes called switching sample) is the time period in which two switchings (which can either be a cell Insert and cell Bypass, or two cell Insert or two cell Bypass operations) are traditionally performed, whereby a half switching duration is a time period which traditionally corresponds to one switching (either a cell insert or bypass operation) opportunity. It can be shown that such PWM of the present invention generates very low lower order harmonics (up to $10^{th}$ harmonics is less than 0.1%) at an average pulse number of between 2 and 2.5.

The reference and actual voltage ($u_{ref}$ and $u_{leg}$) waveforms along with the flux error ($F_{error}$ (Wb)) are shown in the FIGS. 2a-2e. The flux error is computed according to Equation 2.

$$F_{error} = \int (u_{ref} - u_{leg}) dt \qquad \text{Equation 2}$$

In addition, the flux is defined as a time integral of voltage as $F(t)=\int V(t)dt$, such that the flux error can be defined as Equation 2 above. When the flux is expressed for a specific frequency (w) i.e., $V(t)=V_m \sin(wt)$, $F(t)=\int V_m \sin(wt) dt = v_m/w \cos(wt)+F_0$, where $F_0$ is the initial condition of flux and unit of F in the above equation is Volts/Hz. As a result, the flux error ($F_{error}$ (Wb)) can be expressed in terms of frequency as well.

At an instant $t_A$, the phase leg voltage is less than the reference voltage and flux error is $F_A$. The intention is to make this flux error zero, or close to zero, at the end of switching sample (i.e. instant $t_B$). Note that the time scale between $t_A$ and $t_B$ has been magnified in the figures as compared to the time scale from 0 to $t_A$. Now, the trajectory of the flux error for a few different cases will be analysed with reference to the FIGS. 2a-2e. The polarity of the current flowing through the phase leg 2 is considered to be charging the cells 3. The FIGS. 2a-2e relates to when the reference voltage is increasing, when the decision to be taken is whether or not insert an additional cell 3. Similarly, if the reference voltage is decreasing, the decision to be taken is whether or not bypass an additional cell 3. However, we may also have to bypass a cell even when the reference voltage is increasing. This situation may occur when the switching frequency is not very low or if the number of cells in the converter phase leg is low. To give an example, say if there is only one cell, then even for the first 90° of voltage reference (where the reference is increasing only) still we may have to insert once and bypass once the cell in every $T_{sw}$ to make the flux error zero. But when the number of cells are high, e.g. 50, this is usually not needed but still there may in some instances be a need for bypass even when the voltage reference is increasing. For instance, in FIG. 2d at $t_B$ the leg voltage is higher than the reference voltage and the reference is increasing. So in the next half switching time (which is not shown in the figure), we may actually have to decide whether to bypass since the leg voltage is already higher. Similarly, when the reference voltage is decreasing, it may in some cases be desirable to insert a cell rather than only bypass cells. Both the act of inserting a cell and the act of bypassing a cell may be called a switching.

Figure 2A:
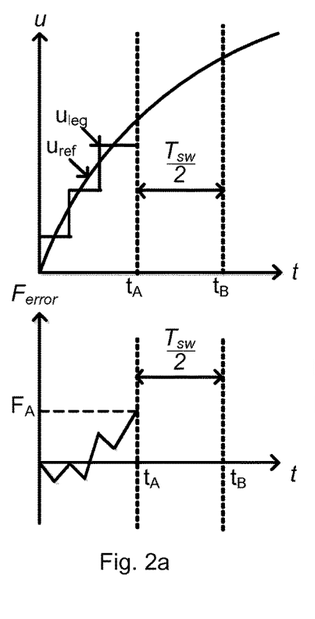
FIG. 2a is a diagram illustrating voltage waveforms and corresponding flux error in accordance with an embodiment of the present invention.

FIG. 2a describes the situation up until the start $t_A$ of the present half switching duration. As can be seen in the top part of the figure, the leg voltage $u_{leg}$ roughly follows the reference voltage $u_{ref}$ in incremental steps corresponding to the insertions of additional cells 3 (switchings) to increase the leg voltage. Similarly, the leg voltage may be reduced in decremental steps by bypassing inserted cells 3 (also by switching). The corresponding flux error is shown in the bottom part of the figure. As can be seen, the flux error is not zero at $t_A$. The proposed PWM scheme may not be activated until $t_A$ (a carrier based PWM may be used) and that may be why the flux error was not zero at $t_A$.

Figure 2B:
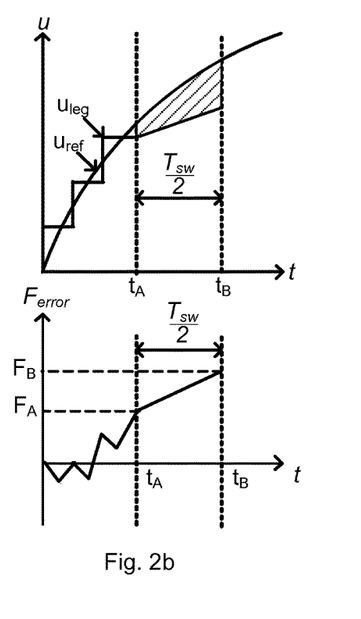
FIG. 2b is a diagram illustrating voltage waveforms and corresponding flux error in accordance with another embodiment of the present invention.

FIG. 2b illustrates the case when no cell is inserted at $t_A$. The flux error is calculated (predicted) at the end of the half switching duration ($t_B$) based on the information of the current flowing through the leg 2, the capacitance of the cells 3 and the number of cells inserted. In this case, the area between the actual leg voltage and the reference voltage (marked with hatched lines), which will drive the flux error to a higher positive value ($F_B$), as shown in the bottom part of the figure.

Figure 2C:
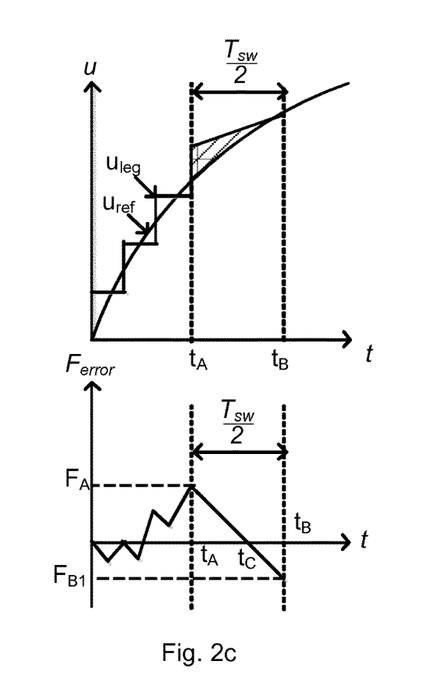
FIG. 2c is a diagram illustrating voltage waveforms and corresponding flux error in accordance with another embodiment of the present invention.

FIG. 2c illustrates the case when one cell is inserted at $t_A$. In this case, the area between the reference voltage and actual leg voltage ($u_{ref}-u_{leg}$) will reduce the flux error and drives it to a negative value ($F_{B1}$) at $t_B$. The flux error curve passes zero (at $t_C$) before $t_B$. Hence, the control unit 10 decides not to perform any switching in this time sample $t_A$ and proceeds to perform similar calculations in the next time sample.

Figure 2D:
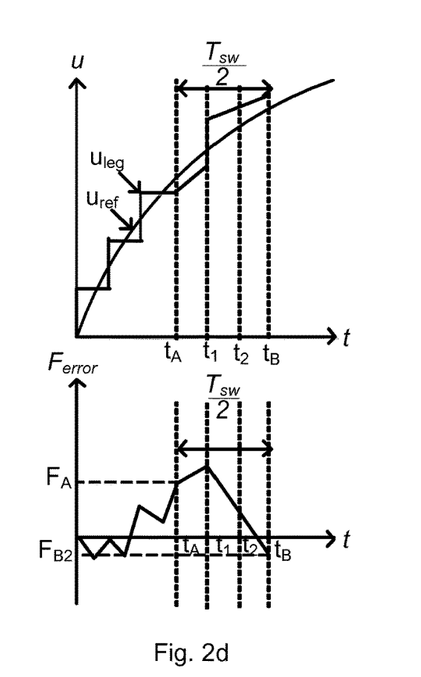
FIG. 2d is a diagram illustrating voltage waveforms and corresponding flux error in accordance with another embodiment of the present invention.

FIG. 2d illustrates the case when one cell is inserted in the time sample $t_1-t_2$. The half switching duration $T_{sw}/2$ is divided into time samples having a predetermined size. Typically, a half switching duration may be divided into 100-500 time samples, but in this hypothetical example (for simplification) there are only three time samples in the present half switching duration, namely $t_A-t_1$, $t_1-t_2$ and $t_2-t_B$. When the cell 3 is inserted at the instant $t_1$, the flux error reaches to $F_{B2}$ (which is less, in absolute value, than $F_{B1}$) at $t_B$. This indicates that the flux error moves towards zero at the end of the present half switching duration. Hence, the control unit 10 decides not to perform any switching in this time sample $t_1-t_2$ and waits for the next time sample $t_2-t_B$ to make the decision for inserting the cell 3.

Figure 2E:
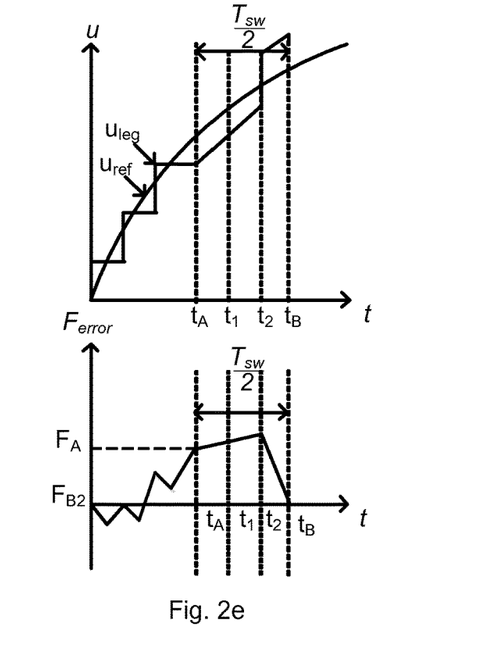
FIG. 2e is a diagram illustrating voltage waveforms and corresponding flux error in accordance with another embodiment of the present invention.

FIG. 2e illustrates the case when one cell is inserted in the time sample $t_2-t_B$. As can be seen in the bottom part of the figure, the flux error is slightly above zero and its value becomes positive at the end of the half switching duration, at $t_B$ if the cell 3 is inserted at the instant $t_2$. This prediction shows that the cell has to be inserted at the instant $t_2$, since waiting till the next time sample will just increase the flux error more towards the positive side. Hence, the control unit 10 generates the command to insert a cell at the time instant $t_2$.

A similar logic as regarding the FIGS. 2a-2e has been developed to generate bypass commands for the cells. The flux error at the end of the half switching duration reduces with the increase in the number of time samples in a half switching duration. This suggests that if the algorithm is executed at higher sampling rates, the harmonic spectrum generated by the converter 1 will have small, negligible or no lower order harmonics.

Basically, with this PWM method, it may be possible to make the flux error to approach zero at the end of each half switching duration $T_{sw}/2$ by switching (insert/bypass a cell 3) at the most appropriate instant. Also, it may be possible to allow additional switching(s) if convenient. The concept of this PWM method may be summarized as follows.

Calculate, in accordance with the above discussion relating to the FIGS. 2a-2e, the cell switching (insert/bypass) instance (if any) for every half switching duration so that the flux error is brought back to zero (or as close to zero as possible in view of the number of time samples used).

Add the flux error at the end of the previous half switching duration so that any error created by the previous half switching durations can be corrected in the present half switching duration.

The following information may be needed for every half switching duration $T_{sw}/2$ to determine the instant of switching:

Leg voltage output ($u_{leg}$), which is calculated based on switching states and measured voltages over the cells 3 in the phase leg 2, for previous time samples and predicted for future time samples in the half switching duration.

Number of cells 3 presently inserted, $N_I$ (can be represented by pINS or nINS in accordance with FIG. 4*a*), or bypassed.

Capacitance per cell, C.

Next cell 3 that will be inserted or bypassed (depends on the type of cell selection method used).

Current flowing through the converter leg 2.

The half switching duration $T_{sw}/2$ is calculated according to Equation 1 and the number of samples ($N_{samI}$) within the half switching duration is computed as follows.

$$N_{samI} = \frac{T_{sw}}{2T_s} = \frac{1}{f_s * PN * NL * 2 * T_s} \quad \text{Equation 3}$$

where, $T_s$ is the size of the time samples (which is also the rate at which the algorithm is executed by the control unit 10).

The half switching duration $T_{sw}/2$ is divided into $N_{samI}$ time samples, each corresponding to a sampling instance (see also FIGS. 2*a*-2*e*, time samples to FIGS. 2*a*-2*e*, $t_A$-$t_1$ or $t_1$-$t_2$ or $t_2$ to $t_B$).

Figure 3:
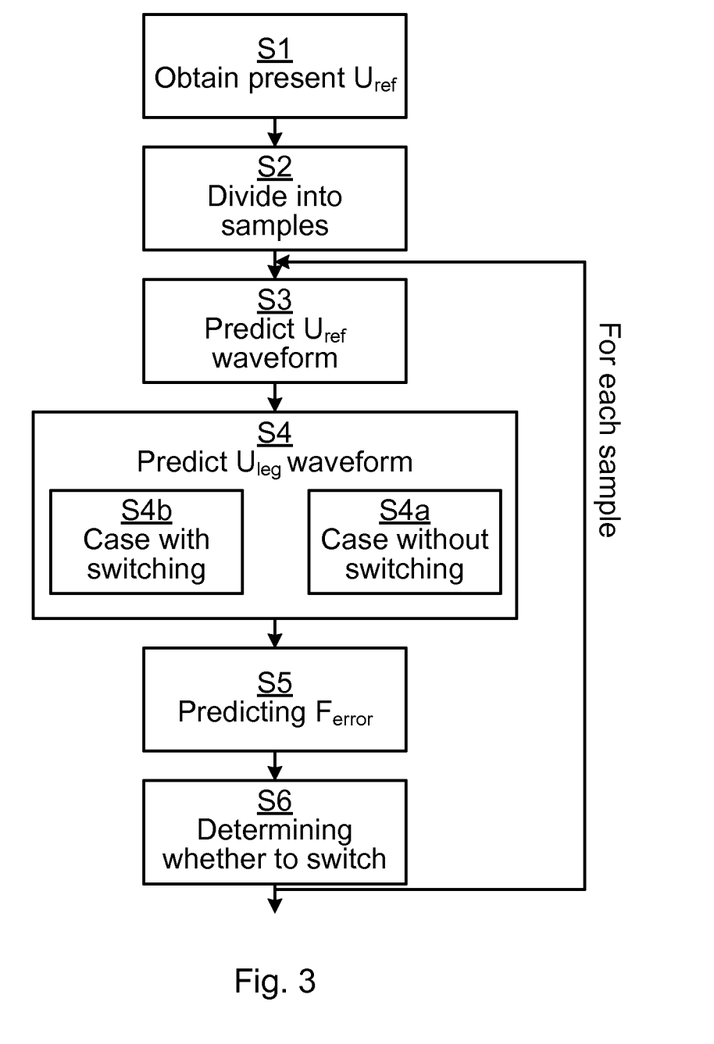
FIG. 3 is a schematic flow chart of an embodiment of the method of the present invention.

FIG. 3 is a schematic flow chart of an embodiment of the method of the present invention. The method is for reducing lower order harmonics of a multi-level power converter 1 comprising at least one phase leg 2 comprising a plurality of chain-link connected cells 3, each cell comprising a capacitor 4. The method comprises, for each phase leg 2 of the converter obtaining S1, e.g. from a current control 11, a present reference voltage $u_{ref}$ for use during a present half switching duration $T_{sw}/2$, and dividing S2 the half switching duration $T_{sw}/2$ into a plurality of time samples $t_A$-$t_1$, $t_1$-$t_2$ and $t_2$-$t_B$. The method also comprises, at the beginning $t_A$, $t_1$ and $t_2$ of each time sample $t_A$-$t_1$, $t_1$-$t_2$ and $t_2$-$t_B$, predicting S3 the reference voltage $u_{ref}$ waveform for the remainder of the half switching duration $T_{sw}/2$ based on the obtained present reference voltage $u_{ref}$. Thus, the reference voltage over the whole half switching duration may be estimated (both from known, past reference voltages, and from estimated, future reference voltages). The method also comprises, at the beginning $t_A$, $t_1$ and $t_2$ of each time sample $t_A$-$t_1$, $t_1$-$t_2$ and $t_2$-$t_B$, predicting S4 the leg output voltage $u_{leg}$ waveform for the remainder of the present half switching duration $T_{sw}/2$ both for the case S4*a* that no cell 3 is inserted or bypassed in the leg 2 during the time sample, and for the case S4*b* that one cell 3 is inserted or bypassed in the leg 2 during the time sample. Thus the real leg output voltage over the whole half switching duration may be estimated (both from known, past leg voltages, and from estimated, future leg voltages). The method also comprises, at the beginning $t_A$, $t_1$ and $t_B$ of each time sample $t_A$-$t_1$, $t_1$-$t_2$ and $t_2$-$t_B$, predicting S5 the flux error $F_{error}$ at the end $t_B$ of the present half switching duration $T_{sw}/2$ for each of the cases, based on the obtained present reference voltage $u_{ref}$, the predicted reference voltage waveform and the predicted leg output voltage $u_{leg}$ waveforms. The flux error resulting from the difference between the predicted reference voltage over the present half switching duration and the predicted real leg voltage over the present half switching duration may be calculated. As discussed herein, this flux error should preferably be as close to zero as possible at the end $t_B$ of the present half switching duration. The method also comprises, at the beginning $t_A$, $t_1$ and $t_2$ of each time sample $t_A$-$t_1$, $t_1$-$t_2$ and $t_2$-$t_B$, determining S6 whether to insert or bypass the cell 3, during the time sample $t_A$-$t_1$, $t_1$-$t_2$ or $t_2$-$t_B$, based on the predicted flux errors $F_{error}$ (one predicted flux error for if switching is not performed in the time sample (case S4*a*) and one predicted flux error for if switching is performed in the time sample (case S4*b*)). By means of the present method, the switching may be performed in the time sample which results in the flux error at the end of the half switching duration ($T_{sw}/2$) which is closest to zero. Typically, only one switching operation (insert or bypass) is performed per half switching duration, but, as discussed herein, a second and possibly even a third or further switching operation may in some embodiments be performed (in different time samples) if it results in a smaller flux error at the end of the half switching duration.

For instance, each $T_{sw}/2$ (e.g. of 100 to 500 microseconds) may e.g. be divided into hundred time samples (e.g. each of ten microsecond or less) and the flux error is predicted S5 in each sample and it is determined S6 whether to insert or bypass or do nothing in the present time sample (for each and every sample of the 100 samples this predictive calculation S5 is performed).

When we are in the first sample and we have got the $u_{ref}$ from the current control 11, we now have to predict S3 the $u_{ref}$ waveform for the rest 99 samples e.g. based on liner/higher order interpolation technique. Note that the $u_{ref}$ for the next 99 sample may be the same as present sample. But it may be good to predict the curve rather than keeping it constant. And when we are in the second sample, we try to predict the rest 98 samples for $u_{ref}$. Note that now we have two sample information to predict the rest 98 so the predicted S3 curve may be different from the previous prediction, but typically by a small amount. We may use a prediction window of the half switching duration (100 samples) from past/present $u_{ref}$ and use this information to predict S3 the $u_{ref}$ of the present/next half switching duration.

We may also calculate the actual flux error of the previous switching duration, $F_{err}(k)$.

$$F_{err} = [U_{ref}(k-1) - U_{leg}(k-1)] * T_s + F_{err}(k-1) \quad \text{Equation 4}$$

where $$U_{leg}(k-1) = \sum_{i=1}^{N} \frac{S_i(k-1) * U_{dc,i}(k-1)}{N} \quad \text{Equation 5}$$

$U_{ref}(k-1)$ is the previous sample obtained voltage reference, $U_{leg}(k-1)$ is the previous sample estimated converter phase leg voltage, $T_s$ is the sampling time of the control unit 10 (to the time duration between $t_A$ and $t_1$ or $t_1$ and $t_2$, etc.), $S_i(k-1)$ is the previous sample switching state of the cells in the converter phase leg, N is the number of cells 3 in the converter phase leg 2, $U_{dc,i}(k-1)$ refers to the previous sample sensed cell capacitor voltages in the phase leg.

Then we may calculate the required Volt-Second (i.e. flux) in view of the $u_{ref}$ for the present half switching duration, which may be calculated as follows $$VS_{U_{ref}} = F_{err}(k) + \sum_{i=k}^{k+N_{sam}} U_{ref}(i) * T_s, \quad \text{Equation 6}$$

Where:

The values of reference voltage, $U_{ref}(k+1)$ to $U_{ref}(k+N_{sam})$ is predicted based on present $U_{ref}(k)$ and previous $U_{ref}(k-1)$ time sample values.

$N_{sam}=N_{samI-1}$ when we are in the first sample for the half switching duration. Now say the time has passed by one microsecond and we are in the second sample of the 100 samples. Then, $N_{sam}$ in Equation 4 will change to $N_{samI-2}$ and when we are in the $3^{rd}$ sample of the 100 samples, $N_{sam}=N_{samI-3}$ and so on.

We may calculate the actual Volt-Second (flux) generated due to the output voltage $u_{leg}$ for the half switching duration if no cell 3 is inserted/bypassed and if one cell is inserted/bypassed, which may be calculated as follows $$VS_{U_{leg}} = \sum_{i=k}^{k+N_{sam}} U_{leg}(i) * T_s, \quad \text{Equation 7}$$

Where:

The present sample value of leg voltage, $U_{leg}(k)$ is calculated as $$U_{leg}(k) = U_{leg}(k-1) + \frac{N_l}{C} I_{leg}(k-1) * T_s \quad \text{Equation 8}$$

$U_{leg}(k-1)$ is calculated in accordance with equation 5, and $I_{leg}(k-1)$ is the sensed current flowing through the phase leg for the previous time sample.

The values of $U_{leg}(k+1)$ to $U_{leg}(k+N_{sam})$ are calculated using equation 8 and predicted values of current $I_{leg}(k)$ to $I_{leg}(k+N_{sam-1})$ based on previous $I_{leg}(k-1)$ time sample values.

If e.g. we are in the $63^{rd}$ sample of the hundred in real time and our calculations based on predicted S5 flux error shows that we should insert (or bypass) a cell in the present sample to achieve zero flux error at the end of the half switching time period. The command to insert (or bypass) a cell 3 is generated and a cell is inserted (or bypassed) in the real system. The cell 3 to be inserted may be chosen based on any known sorting algorithm.

Then we need to calculate the required Volt-Second due to $U_{ref}$ for this half switching sample, which can be calculated as follows, Note that we decided to switch in the $63^{rd}$ sample based on the reference voltage at the $63^{rd}$ sample and the prediction S3 for the remaining time of $T_{sw}/2$ current and cell voltages at the time of the $63^{rd}$ sample. This may change when time progresses, which means that the flux error may not go exactly to zero as predicted at the $63^{rd}$ sample. When we then are in e.g. the $85^{th}$ sample and we see that with the present voltage output $u_{leg}$ and reference voltage $u_{ref}$ and making similar calculations S4 and S5 the flux error is no longer predicted to reach zero but still within a predetermined range around zero, then we determined S6 not to perform a switching. However, when we are in e.g. the $90^{th}$ sample and performing similar calculations S4 and S5 shows that the predicted flux error at the last sample of present $T_{sw}/2$ is not zero and outside the predetermined range, then we determine S6 to allow one more switching within the present $T_{sw}/2$ duration. Again, the same process may follow in which we check if we have to do the additional switching now, in the $90^{th}$ sample or in a coming sample. Note that the concept of allowing more than one switching to make the predicted flux error to zero, within the present $T_{sw}/2$, when the predicted S5 flux error at the end of the present $T_{sw}/2$ (for the case S4a that no switching is performed) is outside a predetermined range is optional but may be very convenient is some embodiments of the present invention. Extra switching may generate even less lower order harmonic spectrum, even at very low (fundamental or close to fundamental) switching frequencies. In addition to the flux error predicted S5, we may also add the real flux error at the end of the previous half switching duration $T_{sw}/2$, to cancel any error from the previous durations.

Note that, though we choose the switching instant (in which sample to switch) to make the flux error to be zero, it may not always become zero in reality since circumstances (e.g. the reference voltage $u_{ref}$, which the current control 11 may update e.g. every 100 microseconds) may change. Also, we may allow a flux error which is less than the predetermined range and only if it exceeds the range, we perform additional switching to make it zero within the same half switching duration. So, this flux error which is within the range in the present half switching duration may be corrected in the next half switching duration.

The control unit 10 may be caused to perform the method by means of running a computer program, as presented above. This computer program may be stored in the storage unit of the control unit 10, or be stored on an external medium, to form a computer program product. The computer program product comprises a computer readable (non-volatile) medium comprising a computer program in the form of computer-executable components. The computer program/computer-executable components may be configured to cause a control unit 10, e.g. as discussed herein, to perform an embodiment of the method of the present disclosure. The computer program/computer-executable components may be run on the processor circuitry of the control unit 10 for causing it to perform the method. The computer program product may e.g. be comprised in a storage unit or memory comprised in the control unit 10 and associated with the processor circuitry. Alternatively, the computer program product may be, or be part of, a separate, e.g. mobile, storage means, such as a computer readable disc, e.g. CD or DVD or hard disc/drive, or a solid state storage medium, e.g. a RAM or Flash memory.

Example

Figure 4A:
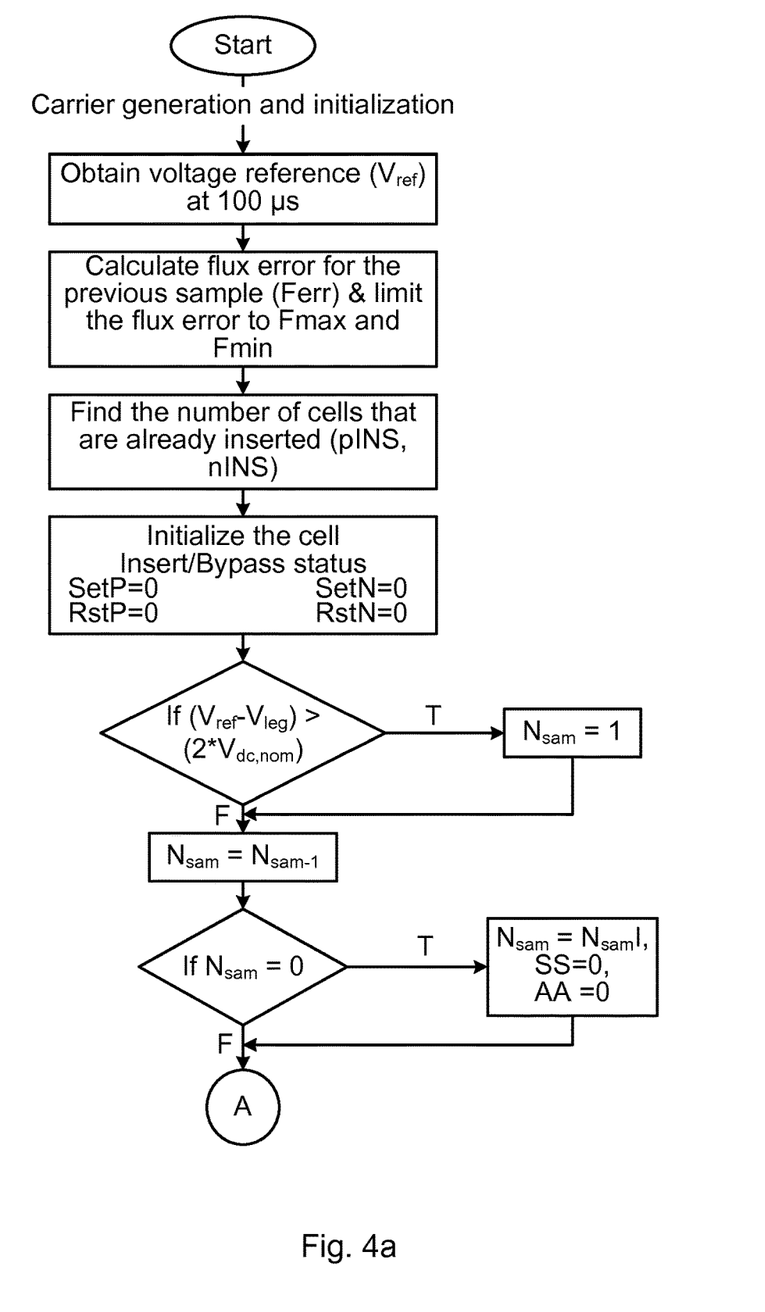
FIG. 4a is a schematic flow chart of a part of an example embodiment of a method algorithm in accordance with the present invention.
Figure 4B:
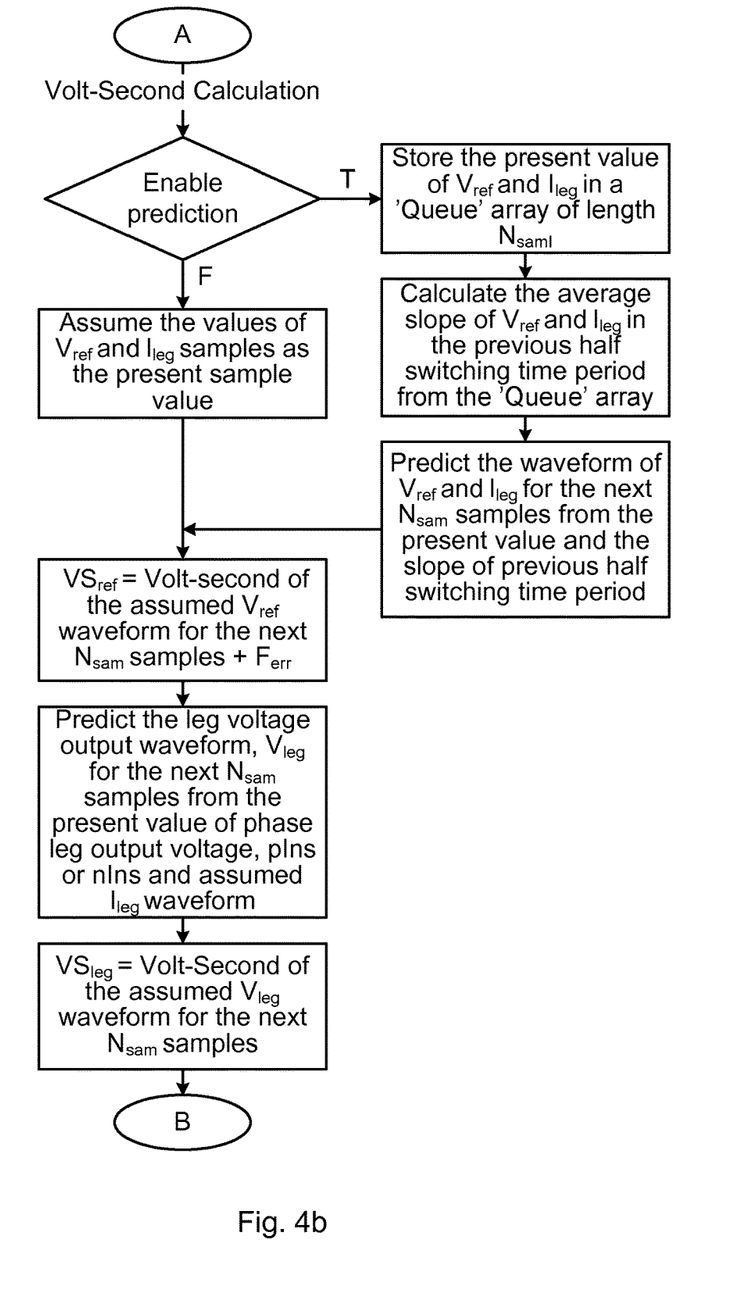
FIG. 4b is a schematic flow chart of another part of an example embodiment of a method algorithm in accordance with the present invention.
Figure 4C:
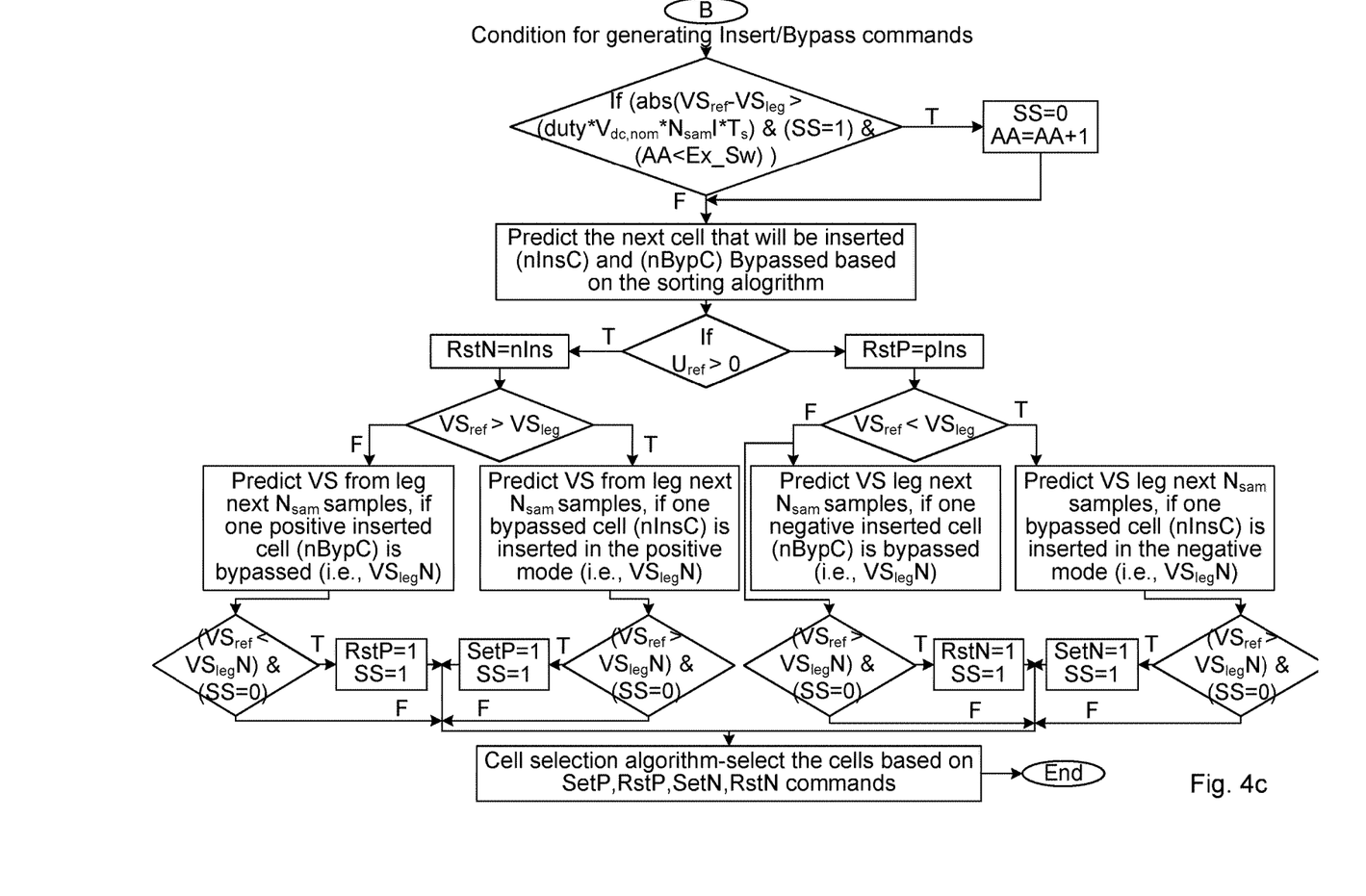
FIG. 4c is a schematic flow chart of another part of an example embodiment of a method algorithm in accordance with the present invention.

In FIGS. 4a, 4b and 4c, an example algorithm for performing some embodiments of the present invention.

$V_{dc,nom}$ is the nominal cell DC voltage

NL is the number of cells 3 in one arm 2 of the converter 1

PN is the pulse number per cell 3

$F_s$ is the fundamental frequency of the converter 1

The Duty may be 0.3

Ex_Sw is the number of additional switching(s) allowed in the half switching duration pIns is the number of cells that are inserted with positive polarity at any given time instant nIns is the number of cells that are inserted with negative polarity at any given time instant SetP, SetN, RstP and RstN are the switching commands to insert a cell with positive polarity, insert a cell with negative polarity, bypass a cell inserted with positive polarity and bypass a cell inserted with negative polarity respectively.

SS and AA are variables that are used to control the number of switchings performed in a half switching duration.

Based on the information of the flux $VS_{leg}$ generated by the leg 2 and the reference flux $VS_{ref}$ based on the reference voltage $u_{ref}$, some conditional logic is used to generate the insert/bypass command. An example of this logic is shown in the FIG. 4.

Now that we generated the insert/bypass command (as a result of the determining S6), a cell sorting algorithm is used to identify which cell 3 is to be inserted/bypassed. Any cell sorting algorithm may be used.

So, we want to switch once, i.e. give one insert or bypass command in every half switching $T_{sw}/2$. But during low switching frequency operation (i.e., fundamental frequency switching), if we only switch once every $T_{sw}/2$, then the flux error may reach high values at the end of the half switching duration rather than going to zero, especially at the high slope regions of the voltage reference. To prevent this from happening, we also allow additional switching(s) to occur within a $T_{sw}/2$.

When to allow more than one switching for every $T_{sw}/2$:
If the predicted flux error at the end of the present $T_{sw}/2$ (or the $N_{samI}^{th}$ sample) is predicted S5 to be more than a predetermined threshold value, then additional switching within the present $T_{sw}/2$ is allowed. The maximum number of additional switchings that are allowed within a $T_{sw}/2$ may be predefined. Usually it is sufficient to allow 1 or 2 additional switchings to get very good harmonic spectrum especially in the lower order harmonics.

$$F_{err,Predict} = | VS_{U_{ref}} \quad VS_{U_{leg,o}} |$$ Equation 9

Where $VSu_{leg},o$ corresponds to flux error when no switching is performed.

$$F_{err,lim} = Duty * V_{dc,norm} * N_{samI} * T_s$$ Equation 10

Where:
Duty is a user defined gain varied between 0-1, and
$V_{dc,nom}$ is the nominal cell capacitor voltage.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for reducing lower order harmonics of a multi-level power converter comprising at least one phase leg comprising a plurality of chain-link connected cells each comprising a capacitor, the method comprising, for each phase leg of the converter:
   obtaining, from a current control, a present reference voltage for use during a present half switching duration, a half switching duration being a time period corresponding to one switching opportunity of the cells;
   dividing the half switching duration into a plurality of time intervals; and
   at the beginning of each time interval:
   predicting the reference voltage waveform for the remainder of the half switching duration based on the present reference voltage;
   predicting the leg output voltage waveform for the remainder of the present half switching duration for the case that switching for one cell is performed in the leg during the time interval;
   predicting a flux error, being a time integral of a difference between the leg output voltage and the reference voltage, at the end of the present half switching duration for the case, based on the present reference voltage, the predicted reference voltage waveform and the predicted leg output voltage waveform, wherein the predicted flux error is a cumulative flux error of the present half switching duration and a preceding half switching duration; and
   determining not to perform switching for any cell in a present time interval of the plurality of time intervals when the predicted flux error passes zero during the first half switching duration.

2. The method of claim 1, wherein switching for only one cell is performed during the present half switching duration.

3. The method of claim 2, wherein a pulse number of the converter is less than 5.5.

4. The method of claim 2, wherein the method is performed by a control unit of the converter.

5. A computer program product embodied on a non-transitory computer readable medium and comprising computer-executable components for causing a control unit for a phase leg of a power converter to perform the method of claim 2 when the computer-executable components are run on processor circuitry comprised in the control unit.

6. The method of claim 1, wherein switching for a second cell, in addition to a first cell for which switching has been performed at a previous time interval, is performed during the present half switching duration when the flux error predicted at a present time interval is outside of a predetermined range.

7. The method of claim 6, wherein a pulse number of the converter is less than 5.5.

8. The method of claim 6, wherein the method is performed by a control unit of the converter.

9. A computer program product embodied on a non-transitory computer readable medium and comprising computer-executable components for causing a control unit for a phase leg of a power converter to perform the method of claim 6 when the computer-executable components are run on processor circuitry comprised in the control unit.

10. The method of claim 1, wherein a pulse number of the converter is less than 5.5.

11. The method of claim 10, wherein the method is performed by a control unit of the converter.

12. A computer program product embodied on a non-transitory computer readable medium and comprising computer-executable components for causing a control unit for a phase leg of a power converter to perform the method of claim 10 when the computer-executable components are run on processor circuitry comprised in the control unit.

13. The method of claim 1, wherein the method is performed by a control unit of the converter.

14. A computer program product embodied on a non-transitory computer readable medium and comprising computer-executable components for causing the control unit for a phase leg of a power converter to perform the method of claim 13 when the computer-executable components are run on processor circuitry comprised in the control unit.

15. A computer program product embodied on a non-transitory computer readable medium and comprising computer-executable components for causing a control unit for a phase leg of a power converter to perform the method of claim 1 when the computer-executable components are run on processor circuitry comprised in the control unit.

16. The method of claim 1, wherein a pulse number of the converter is less than 2.5.

17. A control unit for a phase leg of a multi-level power converter, the control unit comprising:
processor circuitry; and
a storage unit storing instructions executable by said processor circuitry whereby said control unit is operative to:
obtain, from a current control, a present reference voltage for use during a present half switching duration, a half switching duration being a time period corresponding to one switching opportunity of the cells;
divide the half switching duration into a plurality of time intervals; and
at the beginning of each time interval:
predict the reference voltage waveform for the remainder of the half switching duration based on the present reference voltage;
predict the leg output voltage waveform for the remainder of the present half switching duration for the case that switching for one cell is performed in the leg during the time interval;
predict a flux error, being a time integral of a difference between the leg output voltage and the reference voltage, at the end of the present half switching duration for the case, based on the present reference voltage, the predicted reference voltage waveform and the predicted leg output voltage waveform, wherein the predicted flux error is a cumulative flux error of the present half switching duration and a preceding half switching duration; and
determine not to perform switching for any cell in a present time interval of the plurality of time intervals when the predicted flux error passes zero during the first half switching duration.

18. A power converter comprising a plurality of phase legs, each of the plurality of phase legs comprising the control unit of claim 17.

19. The power converter of claim 18, wherein the converter is a three-phase converter connected in a delta configuration or a three-phase converter connected in a Y configuration.

20. A computer program embodied on a non-transitory computer readable medium for reducing lower order harmonics of a multi-level power converter, the computer program comprising computer program code which is able to, when run on processor circuitry of a control unit for a phase leg of the power converter, cause the control unit to:
obtain, from a current control, a present reference voltage for use during a present half switching duration, a half switching duration being a time period corresponding to one switching opportunity of the cells;
divide the half switching duration into a plurality of time intervals; and
at the beginning of each time interval:
predict the reference voltage waveform for the remainder of the half switching duration based on the present reference voltage;
predict the leg output voltage waveform for the remainder of the present half switching duration for the case that switching for one cell is performed in the leg during the time interval;
predict a flux error, being a time integral of a difference between the leg output voltage and the reference voltage, at the end of the present half switching duration for the case, based on the present reference voltage, the predicted reference voltage waveform and the predicted leg output voltage waveform, wherein the predicted flux error is a cumulative flux error of the present half switching duration and a preceding half switching duration; and
determine not to perform switching for any cell in a present time interval of the plurality of time intervals when the predicted flux error passes zero during the first half switching duration.

* * * * *